No. 666,378. Patented Jan. 22, 1901.
J. W. DICKINSON, Jr.
BALL BEARING BOXING.
(Application filed Apr. 25, 1899.)
(No Model.)
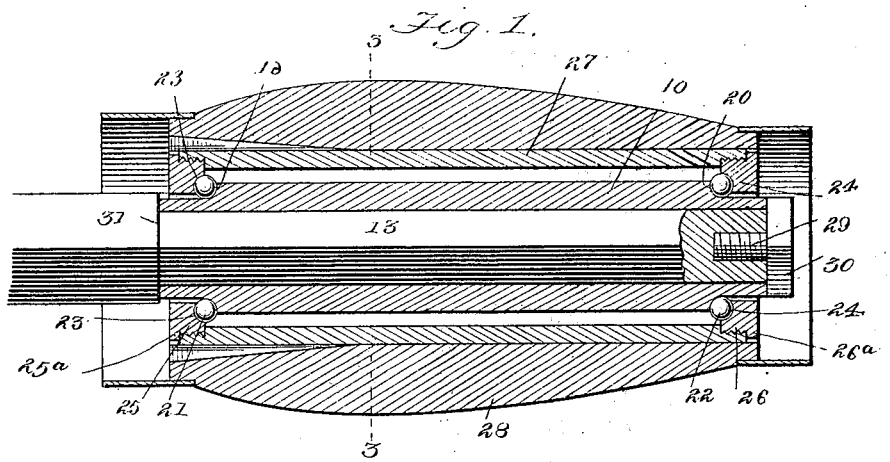
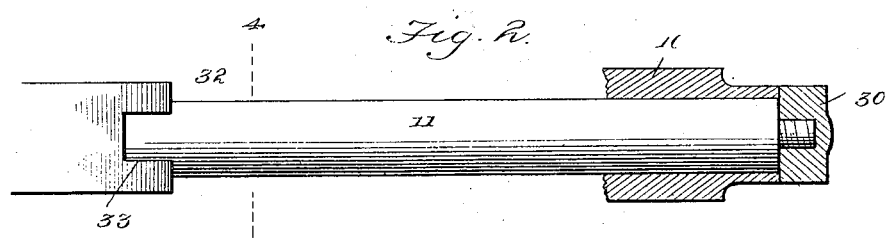
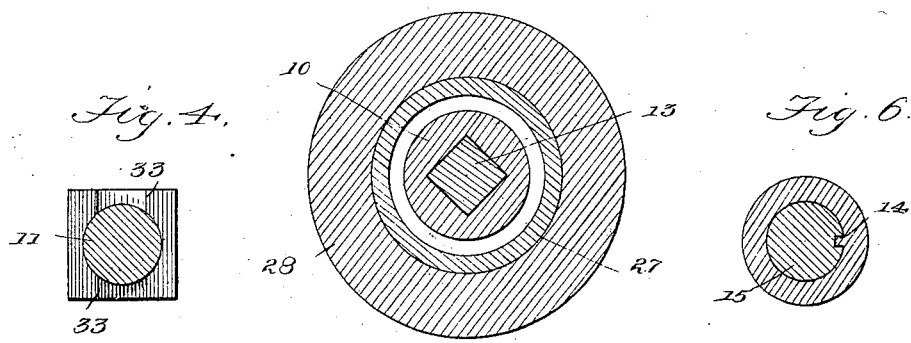
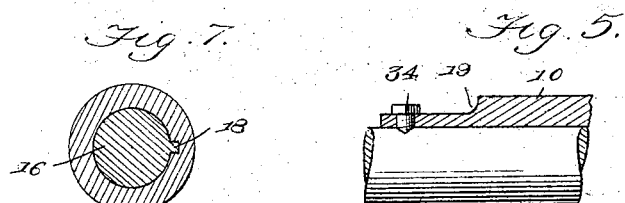
Witnesses
F. W. Riley,
Chas. E. Brock
Inventor
J. W. Dickinson, Jr.
by Onward
Attorneys
THE NORRIS PETERS CO., PHOTO-LITHO., WASHINGTON, D. C.

UNITED STATES PATENT OFFICE.

JOHN WESLEY DICKINSON, JR., OF LITTLE ROCK, ARKANSAS, ASSIGNOR OF TWO-THIRDS TO W. W. DICKINSON AND C. F. DICKINSON, OF SAME PLACE.

BALL-BEARING BOXING.

SPECIFICATION forming part of Letters Patent No. 666,378, dated January 22, 1901.

Application filed April 25, 1899. Serial No. 714,401. (No model.)

*To all whom it may concern:*

Be it known that I, JOHN WESLEY DICKINSON, Jr., a citizen of the United States, residing at Little Rock, in the county of Pulaski and State of Arkansas, have invented a new and useful Ball-Bearing Boxing, of which the following is a specification.

My invention relates to boxings or sleeves for insertion into revolving bodies—such as wheels, rollers, or pulleys—or into bearings in which bodies rotate, such as the bearings of shafts, the object of the invention being to provide a boxing ready to be inserted into position, having an improved ball-bearing and constructed in a simple, cheap, and efficient form.

The invention consists in certain details of construction and novelties of combination, all of which will be fully described hereinafter and pointed out in the claim.

In the drawings forming part of this specification, Figure 1 is a longitudinal sectional view, partly in elevation, illustrating the application of my invention to a vehicle-wheel hub and a square axle-spindle. Fig. 2 is a similar view, omitting the hub, illustrating its application to a round axle-spindle, different securing means being shown. Fig. 3 is a transverse sectional view on the plane indicated by the dotted line 3 3 of Fig. 1. Fig. 4 is a similar view on the plane indicated by the dotted line 4 4 of Fig. 2. Figs. 5, 6, and 7 are sectional detail views illustrating the manner of applying the invention to use on shafts, various securing means being shown.

Like numerals of reference indicate the same parts wherever they occur in the various figures of the drawings.

Referring to the drawings by numerals, 10 indicates a sleeve outwardly cylindrical in form, but with a bore shaped in cross-section to suit the spindle or shaft upon which it is to be placed, being shown with a cylindrical bore in Figs. 2, 4, and 5 to fit a cylindrical spindle 11 in Figs. 2 and 4 and a shaft 12 in Fig. 5, with a square bore in Figs. 1 and 3 to fit a square spindle 13, with a cylindrical bore and feather 14 in Fig. 6 to fit a cylindrical grooved shaft 15, and with a cylindrical bore and groove in Fig. 7 to fit a cylindrical shaft 16 with feather 18. Many other forms might be shown, according to the shaft or spindle on which the sleeve is to be fitted, the object being to prevent the turning of the sleeve on the shaft or spindle.

The sleeve 10 is of less thickness at its ends than in its middle portion, the shoulders at the junction of the two diameters forming cones 19 20 for steel balls 21 22, the cups being formed at 23 24 in collars 25 26, threaded in the enlarged ends of the box 27. Although the parts 25 and 26 correspond with the cups in the usual ball-bearings, yet as they also perform the functions of collars I prefer to call them "collars" and designate the recessed portions 23 and 24 as "cups." This box consists of a cylindrical sleeve of a greater diameter, but of a less length, than the sleeve 10 and corresponds to the ordinary box which is usually driven into the hub 28 and may be provided with ribs or like projections on its outer surface to prevent its turning in the hub.

When the sleeve, balls, and collars are in place in the box 27, they form my ball-bearing boxing, which may be slipped upon an axle-spindle and secured thereon by a suitable retaining device, as a screw 29, threaded into the end of the spindle, as in Fig. 1, or by a nut 30, threaded on the end of the spindle, as in Fig. 2. In either case the inner end of the sleeve 10, which projects through collar 25, abuts against the usual flange 31 on the spindle, while the screw 29 or nut 30, as the case may be, has its bearing against the outer end of the spindle projecting beyond collar 26. By constructing the parts in this manner the wheel is held in position upon the axle by reason of the balls 23 lying between the collar 26 and the shoulder 19, formed on the inner end of the sleeve 10, thereby permitting of the nut 30 being only large enough to engage with the outer end of the sleeve 10. This will prevent the possibility of foreign substances getting in between the nut 30 or other retaining device and the collar 26 and locking the collar against rotation as the wheel is turned, and thereby changing the adjustment of the collar in relation to the balls in the bearing. It will also permit of the retaining device being made so small that the ordinary wrench will fit over it.

The spindle 13 being square and the bore of the sleeve shaped to fit thereon, the sleeve cannot turn; but with round or cylindrical shafts or spindles and a corresponding bore in the spindles means must be provided to prevent the turning of the sleeve. These means may be varied, Fig. 2 showing fingers 32 on the spindle projecting into corresponding notches in the body 33 of the axle, and Fig. 5 a set-screw 34, threaded through the sleeve and bearing upon the shaft 12. The same result is attained in Fig. 6 by the feather 14 and grooved shaft 15 and in Fig. 7 by the feather 18 on shaft 16.

When my invention is applied to a vehicle-wheel, the boxing complete is secured in the hub, when the wheel may be slipped on or off the spindle and secured thereon with exactly the same labor required to place or displace an ordinary wheel. The bearing may be adjusted by turning either or both of the collars 25 and 26, and the balls are fully protected from dust, dirt, and water. The collars 25 and 26 have rim-flanges 25ª 26ª, which prevent them from being screwed too tightly against the balls, the shoulders in box 27 also serving the same purpose. As before stated, the ball-bearing boxing may be secured in shaft-bearings to receive the shaft, furnishing it with ball-bearings.

By making each of the sleeves continuous throughout its length they are much stronger and are better adapted for use within the hub of the ordinary wheel than if they were composed of sections bolted together, and by making the larger sleeve shorter than the smaller one the collars 25 and 26 can be inserted or screwed onto the inner sleeve far enough to be out of engagement with the shoulder 31 at one end and the nut 30 at the other end, thereby avoiding the possibility of the collars being accidentally screwed up too tight or loosened from contact with the shoulder or nut.

The structure is extremely simple and cheap, only three parts (the sleeve and the collars) besides the balls being added to the usual boxing. The expense attending the furnishing of these parts is to a certain extent balanced by the saving of the labor now necessary to fit the spindle and boxing, these parts requiring no fine finishing with my invention.

Having thus fully described my invention, what I claim as new, and desire to secure by Letters Patent of the United States, is—

The combination with the axle and hub of a wagon, of a sleeve rigidly secured to the axle against rotation and a sleeve rigidly secured in the hub, the sleeve in the hub being of less length than the sleeve on the axle and having each end interiorly screw-threaded and shouldered, and the sleeve on the axle having each end reduced to form a shoulder, the shoulders on the sleeve on the axle being each located at a greater distance from the end of the hub than the shoulder in the sleeve in the hub, a screw-threaded collar in each end of the sleeve in the hub, the inner edge of which is shouldered to correspond with the shoulder on that end of the sleeve on the axle and the outer edge is at a distance from the outer end of said sleeve, antifriction-balls between said collars and the shoulders on the sleeve on the axle, and a retaining device at the outer end of the axle in engagement with the outer end of the sleeve on the axle, the periphery of which does not extend beyond the periphery of the end of said sleeve.

JOHN WESLEY DICKINSON, Jr.

Witnesses:
CHARLES FENNER DICKINSON,
CHARLES EDWARD SHOEMAKER.